209. CLASSIFYING, SEPARATING, AND ASSORTING SOLIDS.

358

No. 12,464. REISSUED MAR. 20, 1906.

W. G. GADUE.

DUSTLESS FLOUR CAN AND FLOUR HOLDER.

APPLICATION FILED FEB. 1, 1906.

EXAMINER.

Witnesses.
Robert Pruett,
H. Pe Helms

Inventor.
William G. Gadue.
By Marcellus Bailey
Atty

434

209. CLASSIFYING, SEPARATING, AND ASSORTING SOLIDS.

358

UNITED STATES PATENT OFFICE.

WILLIAM G. GADUE, OF BURLINGTON, VERMONT, ASSIGNOR, BY DIRECT AND MESNE ASSIGNMENTS, TO GADUE DUSTLESS FLOUR SIFTER COMPANY, OF BURLINGTON, VERMONT, A CORPORATION OF VERMONT.

DUSTLESS FLOUR-CAN AND FLOUR-HOLDER.

No. 12,464. Specification of Reissued Letters Patent. Reissued Mar. 20, 1906.

Original No. 785,545, dated March 21, 1905. Application for reissue filed February 1, 1906. Serial No. 299,064.

*To all whom it may concern:*

Be it known that I, WILLIAM G. GADUE, a citizen of the United States, residing in the city of Burlington, in the county of Chittenden and State of Vermont, have invented a new and useful Improvement in Dustless Flour-Cans and Flour-Holders, of which the following is a specification.

My invention consists of a flour can and holder for household use where flour can be kept free from dust and other objectionable things, and when any is wanted for use, ever so small or so large a quantity, it can be sifted into any receptacle desired. The can or holder is made of tin or other metal, holding from twenty to fifty pounds of flour, with no openings except at the top, which is closed by a cover. At the bottom a sieve is firmly soldered, with a slight ridge around the edge of said sieve.

Figure 1:
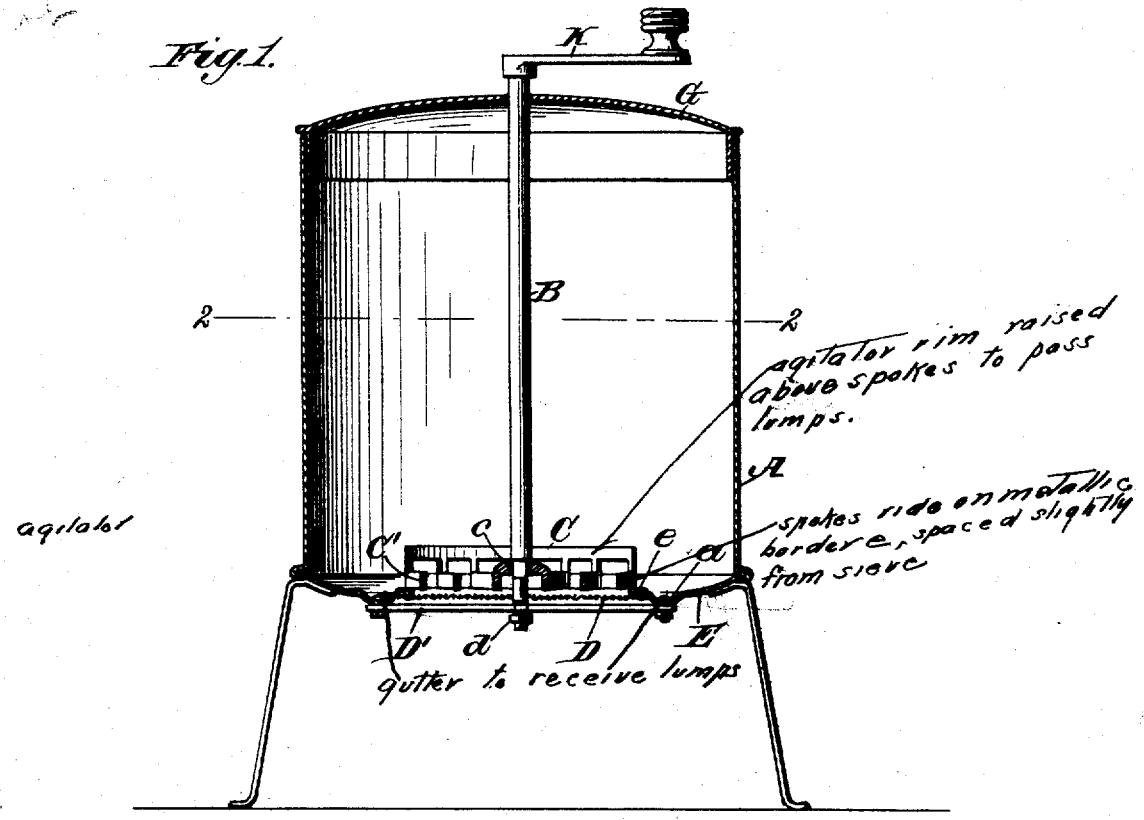
Figure 2:
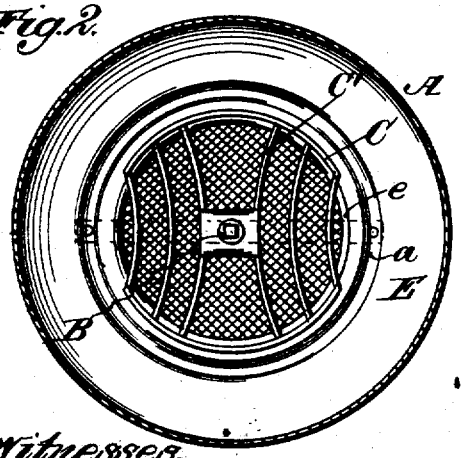
Figure 3:
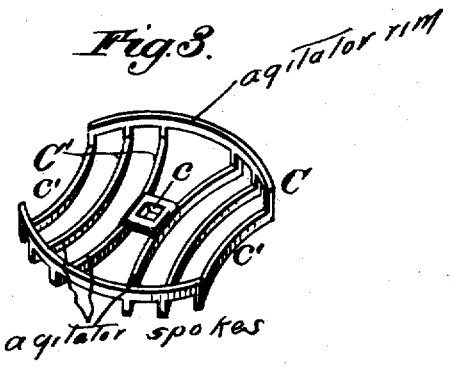

Figure 1 is a vertical sectional view of the device on line 1 1, Fig. 2. Fig. 2 is a horizontal section of the same on line 2 2, Fig. 1. Fig. 3 is a perspective view of the agitator detached.

A is the cylindrical body of the flour-holding can, made of tin or other metal and supported by suitable legs, as shown in Fig. 1. The bottom E of the can (united to the body of the can by a lock-seam) is dished and has in it a central circular opening, to which is applied a wire-cloth sieve D, applied and soldered to the outer face of the bottom E, so as to be below the portion *e* of the bottom, which borders the sieve, which portion is slightly raised above the sieve-surface to support and form a bearing for the spokes of the agitator hereinafter described. The bottom E, as before said, is dished, the depth of dish or bevel being about one and one-half inches. The bottom around its inner border or rim is depressed, as at *a a*, the depression forming a shallow annular gutter about half an inch wide surrounding the metallic border of the bottom, which circumscribes the sieve-surface D.

B is a vertical shaft which passes through and is journaled in the cover G of the can and has attached loosely to its lower end the agitator C. The shaft at its extreme lower end passes loosely through the sieve D and through a cross-bar D′, in which it can revolve, and has on its screw-threaded lower end below the cross-bar D′ a holding-nut *d*. The agitator C is loosely mounted on a squared portion of the shaft B, which passes through a correspondingly-shaped hole in the central strap *c* of the agitator, so that the agitator while revolving with the shaft may have a slight rocking motion relatively thereto. The upper end of the shaft which projects above the cover G has detachably connected with it a crank K, by which it may be rotated.

The agitator consists of the rim C and the curved spokes C′, on the upturned ends of which the rim C is supported, the rim being broken away on the two opposite sides of the agitator, as seen in Figs. 2 and 3 at *c*′. The spokes C′ extend outwardly beyond the point where the sieve ends and overlap and rest upon the metallic border *e*, which surrounds the sieve. The bent-up ends of the spokes support the rim C of the agitator in a position in which it will be about half an inch above the bottom, thus leaving ample room for lumps and all undesirable objects to be thrown out by the spokes as the agitator revolves. By the action of the spokes the lumps are carried outward beyond the sieve-surface onto the border *e*, overlapped by the spokes, where they pass under the rim into the gutter *a*, this being greatly facilitated by the two sides of the agitator being broken away, as shown at *c*′, Figs. 2 and 3. The agitator C is of cast-iron, the rim and spokes cast in one piece.

After a series of experiments it was found that the raising of the rim C of the agitator by the bent-up ends of the spokes and the breaking away of the same on opposite sides enabled the agitator to effectively act to carry all undesirable objects outwardly beyond the sieve-surface, discharging them under the rim and out where the sides are broken away into the gutter.

Fig. 3 shows how the rim C of the agitator is raised up from the bottom by the bent-up ends of the spokes. It was found after many experiments that this peculiar shape of the spokes—namely, bent up at their outer ends, so as to make about half an inch between the rim C of the agitator and the metallic border *e* around the outer edge of the sieve—was necessary in order to do good work. When the agitator is in revolution, the action of the spokes is to carry lumps and impurities outwardly beyond the sieve-surface D and onto the solid metallic border *e*, out upon which it can freely pass under the rim C, and there the refuse will be kept.

It will be observed that the agitator rests by its spokes upon the metallic border *e*, which is slightly raised above the sieve-surface, so that the spokes have this border for a bearing and are thus kept from touching the sieve, although they run very close to the same. The rim C, being raised up from the bottom by the bent-up ends of the spokes, makes room for the outward passage beneath it of the lumps and other impurities outwardly conveyed beyond the sieve area by the action of the spokes while the agitator is in revolution. The gutter *a*, which I provide for catching these outwardly-impelled impurities, is, as before said, half an inch or more in width; but this width can be varied as desired.

To use the device, first put in the shaft B, with the agitator attached to its lower end by a loose joint, and then put in the flour. The cover G is then put on, with the shaft B through the middle, and the crank K is fitted on the square upper end of the shaft. The device is now ready for use and by rotation of the crank will deliver sifted flour in any quantity desired, the action of the agitator being to carry all impurities outwardly beyond the sieve-surface and keep them there, so that none will pass through the sieve. The agitator, as already stated, bears upon the metallic raised border *e* around the sieve, and when a quantity of flour is put into the can the weight of the flour will prevent the agitator from moving with entire ease at first, but very soon the flour will work under the agitator between it and its annular bearing-surface, so as to lubricate the same, thus permitting its easy and free movement.

What I claim as my invention, and desire to secure by Letters Patent, is—

1. A can having a dished bottom with a central opening therein, a screen closing said opening, that portion of the bottom bordering the screen being slightly raised above the surface of the latter, in combination with an agitator consisting of curved spokes which extend outwardly beyond the screen and take their bearing upon the slightly-raised border surrounding the same, and a rim supported in elevated position upon the upturned ends of said spokes, and actuating means for said agitator, substantially as and for the purposes hereinbefore set forth.

2. The agitator consisting of a rim, and curved spokes, provided with upturned ends which support said rim, in combination with the can, the sieve or screen in the bottom of the can and an actuating-shaft loosely attached to said agitator substantially as and for the purposes hereinbefore set forth.

3. The agitator consisting of the curved spokes C′ provided with upturned ends, and the rim C supported on said upturned ends, and broken away at *c′* on opposite sides of the agitator, substantially as and for the purposes hereinbefore set forth.

4. The can A provided with a bottom having a slightly-raised border *e* encircling an opening therein, a gutter *a* surrounding said border and a screen applied to said opening, in combination with the agitator consisting of the spokes C′ extending outwardly beyond the screen and upon the border *e*, and the rim C supported upon the upturned ends of said spokes, and means for actuating said agitator substantially as and for the purposes set forth.

WILLIAM G. GADUE.

Witnesses:
HENRY B. SHAW,
GEORGE E. HACK.